US011882256B2

(12) United States Patent
Deura et al.

(10) Patent No.: US 11,882,256 B2
(45) Date of Patent: Jan. 23, 2024

(54) INFORMATION PROCESSING APPARATUS NOTIFYING OF AMOUNT OF FEE TO BE CHARGED FOR IMAGE FORMATION ON PRINTING MEDIUM IN ADVANCE

(71) Applicant: Brother Kogyo Kabushiki Kaisha, Nagoya (JP)

(72) Inventors: Yushi Deura, Nagoya (JP); Shunsuke Minamikawa, Nagoya (JP); Tetsuya Okuno, Nagoya (JP); Haruka Azechi, Nagoya (JP); Ayaka Hotta, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/934,245

(22) Filed: Sep. 22, 2022

(65) Prior Publication Data

US 2023/0012082 A1 Jan. 12, 2023

Related U.S. Application Data

(63) Continuation of application No. PCT/JP2021/011393, filed on Mar. 19, 2021.

(30) Foreign Application Priority Data

Mar. 31, 2020 (JP) ................. 2020-062959

(51) Int. Cl.
*G06F 3/12* (2006.01)
*H04N 1/34* (2006.01)
*H04N 1/00* (2006.01)

(52) U.S. Cl.
CPC ......... *H04N 1/342* (2013.01); *H04N 1/00212* (2013.01)

(58) Field of Classification Search
CPC ..... H04N 1/342; H04N 1/00212; H04N 1/344
See application file for complete search history.

(56) References Cited

U.S. PATENT DOCUMENTS

2003/0107762 A1 6/2003 Kinoshita et al.
2003/0160997 A1 8/2003 Kimura
(Continued)

FOREIGN PATENT DOCUMENTS

JP 2003-167694 A 6/2003
JP 2005-352584 A 12/2005
(Continued)

OTHER PUBLICATIONS

English translation of the International Preliminary Report on Patentability (Chapter I) dated Sep. 29, 2022 (Application No. PCT/JP2021/011393).

(Continued)

*Primary Examiner* — Moustapha Diaby
(74) *Attorney, Agent, or Firm* — BURR PATENT LAW, PLLC

(57) ABSTRACT

An information processing apparatus includes a controller. The controller receives a first e-mail from an external device. The first e-mail has a print file attached thereto and is addressed to a device e-mail address assigned to a printing device. The controller determines a fee to be charged for image formation based on the attached print file. The controller generates a second e-mail including: a first amount that is the amount of the determined fee; and a first URL for a payment page for paying the first amount. The controller transmits the generated second e-mail to the external device in reply to the received first e-mail. After payment of the first amount is completed through access to the first URL included in the transmitted second e-mail, the controller (Continued)

transmits to the external device either print data based on the print file or storage destination information for the print data.

14 Claims, 12 Drawing Sheets

(56) References Cited

U.S. PATENT DOCUMENTS

| | | | |
|---|---|---|---|
| 2005/0270569 A1 | 12/2005 | Hayashi | |
| 2006/0126119 A1* | 6/2006 | Morales | G06F 3/1208 358/1.18 |
| 2009/0066985 A1* | 3/2009 | Ferlitsch | G06Q 10/107 455/406 |
| 2013/0182277 A1* | 7/2013 | Iguchi | G06K 15/02 358/1.14 |
| 2013/0332546 A1* | 12/2013 | Miyazawa | H04L 51/48 709/206 |
| 2019/0258431 A1* | 8/2019 | Yamamoto | G06F 3/1268 |
| 2019/0364158 A1* | 11/2019 | Curry | G06Q 20/3276 |
| 2021/0294547 A1* | 9/2021 | Kuroda | G06F 3/1236 |

FOREIGN PATENT DOCUMENTS

| | | |
|---|---|---|
| JP | 2007-250001 A | 9/2007 |
| JP | 2014-036239 A | 2/2014 |

OTHER PUBLICATIONS

International Search Report (with English translation) and Written Opinion, International Application No. PCT/JP2021/011393, dated Jun. 1, 2021 (8 pages).

* cited by examiner

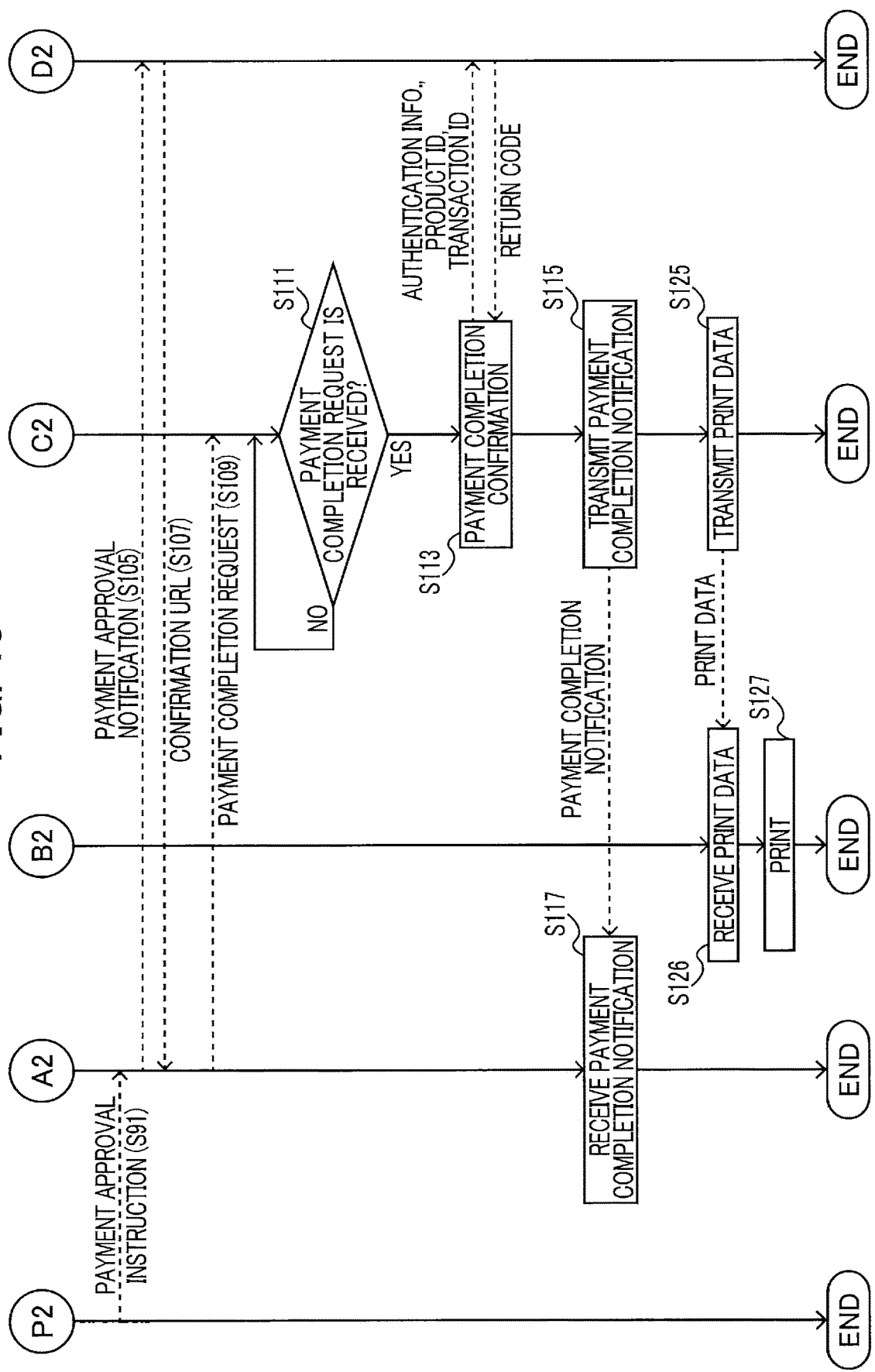

INFORMATION PROCESSING APPARATUS NOTIFYING OF AMOUNT OF FEE TO BE CHARGED FOR IMAGE FORMATION ON PRINTING MEDIUM IN ADVANCE

REFERENCE TO RELATED APPLICATIONS

This application is a by-pass continuation application of International Application No. PCT/JP2021/011393 filed on Mar. 19, 2021 claiming priority from Japanese Patent Application No. 2020-062959 filed on Mar. 31, 2020. The entire contents of the international application and priority application are incorporated herein by reference.

BACKGROUND ART

There has been known a conventional print control device having an e-mail print function of receiving an e-mail and its attachment from a smartphone and having an image forming apparatus print out the attachment.

DESCRIPTION

In recent years, there have been proposed a printing service based on electronic payment. In the proposed printing service, the service provider charges users based on the content of the images to be printed and prints the images after a payment process is completed for the charged fee. When such electronic payments are applied to e-mail printing, such as the conventional technology described above, it would be convenient for users to know in advance how much they will be charged for print jobs. However, no conventional technologies exist that take this need into account.

In view of the foregoing, it is an object of the present disclosure to provide an information processing apparatus, a printing system, and an information processing method that enhance user convenience by enabling users to learn in advance the amount to be paid by electronic payment in an e-mail print service of printing a printing target file attached to an e-mail.

In order to attain the above and other object, according to one aspect, the present disclosure provides an information processing apparatus including a communication interface and a controller. The communication interface is for communicating with a printing device via a network. The printing device is configured to perform image formation on a printing medium. The controller is configured to perform: (a) receiving; (b) determining; (c) generating; (d) transmitting; and (e) transmitting. In the receiving (a), the controller receives a first e-mail from an external device. The first e-mail is an e-mail having a print file attached thereto and addressed to a device e-mail address assigned to the printing device. In the determining (b), the controller determines a fee to be charged for performing image formation on a printing medium on the basis of the print file attached to the first e-mail received in the receiving (a). In the generating (c), the controller generates a second e-mail. The second e-mail includes a first amount that is the amount of the fee determined in the determining (b), and a first URL for a payment page for paying the first amount. In the transmitting (d), the controller transmits the second e-mail generated in the generating (c) to the external device in reply to the first e-mail received in the receiving (a). In the transmitting (e), after payment of the first amount is completed through access to the first URL included in the second e-mail transmitted in the transmitting (d), the controller transmits either print data based on the print file or storage destination information for the print data to the printing device via the communication interface.

According to another aspect, the present disclosure also provides a printing information system including a printing device and a data processing server. The printing device includes a first controller and a printing engine. The printing engine is configured to perform image formation on a printing medium. The data processing server includes a second controller and a communication interface. The communication interface is for communicating with the printing device via a network. The second controller is configured to perform: (a) receiving; (b) determining; (c) generating; (d) transmitting; and (e) transmitting. In the receiving (a), the second controller receives a first e-mail from an external device. The first e-mail is an e-mail having a print file attached thereto and addressed to a device e-mail address assigned to the printing device. In the determining (b), the second controller determines a fee to be charged for performing image formation on a printing medium on the basis of the print file attached to the first e-mail received in the receiving (a). In the generating (c), the second controller generates a second e-mail. The second e-mail includes a first amount that is the amount of the fee determined in the determining (b), and a first URL for a payment page for paying the first amount. In the transmitting (d), the second controller transmits the second e-mail generated in the generating (c) to the external device in reply to the first e-mail received in the receiving (a). In the transmitting (e), after payment of the first amount is completed through access to the first URL included in the second e-mail transmitted in the transmitting (d), the second controller transmits either print data based on the print file or storage destination information for the print data to the printing device via the communication interface. The first controller is configured to perform: (f) acquiring; and (g) controlling. In the acquiring (f), the first controller acquires the print data transmitted in the transmitting (e) or the first controller acquires the print data from a storage destination accessible using the storage destination information transmitted in the transmitting (e). In the controlling (g), the first controller controls the printing engine to perform image formation on the printing medium on the basis of the print data acquired in the acquiring (f) on the printing medium.

According to still another aspect, the present disclosure further provides an information processing method for an information processing apparatus. The information processing apparatus includes a controller and a communication interface. The communication interface is for communicating with a printing device via a network. The printing device is configured to perform image formation on a printing medium. The information processing method includes: (a) receiving; (b) determining; (c) generating; (d) transmitting; and (e) transmitting. The receiving (a) receives a first e-mail from an external device. The first e-mail is an e-mail having a print file attached thereto and addressed to a device e-mail address assigned to the printing device. The determining (b) determines a fee to be charged for performing image formation on a printing medium on the basis of the print file attached to the first e-mail received in the receiving (a). The generating (c) generates a second e-mail. The second e-mail includes a first amount that is the amount of the fee determined in the determining (b), and a first URL for a payment page for paying the first amount. The transmitting (d) transmits the second e-mail generated in the generating (c) to the external device in reply to the first e-mail received in the receiving (a). The transmitting (e) transmits, after payment of the first amount is completed through access to the first URL included in the second e-mail transmitted in the transmitting (d), either print data based on the print file or storage destination information for the print data to the printing device via the communication interface.

According to the above aspects, in an e-mail print in which printing is performed based on a print file attached to an e-mail, the user can learn in advance the amount to be paid by electronic payment, thereby improving user convenience.

FIG. 4 is a view illustrating an example of an e-mail address display page displayed on the mobile terminal and the like.

FIG. 13 is a sequence diagram illustrating steps in the process executed by the mobile terminal, the multifunction peripheral, the data processing server, and the transaction server.

Figure 1:
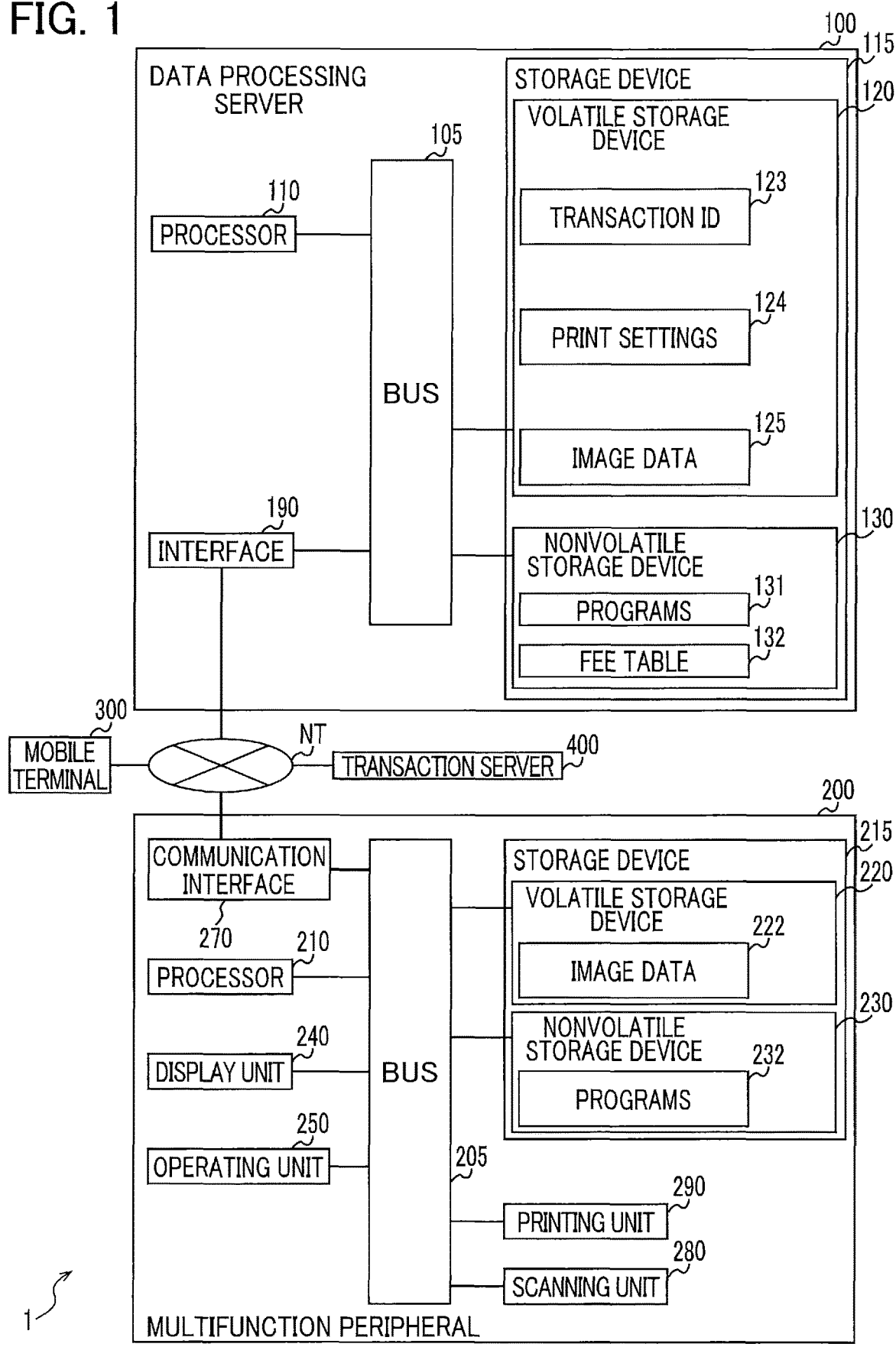
FIG. 1 is a functional block diagram illustrating the schematic overall configuration of a printing system.

Hereinafter, one embodiment of the present disclosure will be described while referring to the accompanying drawings. FIG. 1 shows a printing system 1 according to the embodiment of the present disclosure. The printing system 1 provides a printing service to users, i.e., customers in which the users pay a fee to use the printing function of a multifunction peripheral 200.

<Overview of the Printing System>

The printing system 1 in FIG. 1 includes a data processing server 100, the multifunction peripheral 200, a mobile terminal 300, and a transaction server 400. The data processing server 100, multifunction peripheral 200, mobile terminal 300, and transaction server 400 are interconnected over a network NT and can communicate with each other. The data processing server 100 is an example of the information processing apparatus.

<Data Processing Server>

The data processing server 100 is, for example, a server that is installed and managed by the manufacturer of the multifunction peripheral 200. The data processing server 100 includes a processor 110, a storage device 115, and an interface 190. The processor 110, storage device 115, and interface 190 are interconnected via a bus 105. The processor 110 is an example of the controller and is also an example of the second controller. The interface 190 is an example of the communication interface.

The storage device 115 includes a volatile storage device 120, and a nonvolatile storage device 130. The volatile storage device 120 is DRAM, for example. The volatile storage device 120 has a transaction ID storage area 123, a print settings storage area 124, and an image data storage area 125. The nonvolatile storage device 130 is a hard disk drive or a solid state drive, for example. The nonvolatile storage device 130 has a program storage area 131 for storing various programs, and a fee table storage area 132. The storage content of these storage devices will be described later in detail.

Of the various programs stored in the program storage area 131, an information processing program that pertains to executing the process described later in FIGS. 2, 7, 10, 13, and the like is stored in the nonvolatile storage device 130 in advance.

The processor 110 is a device that performs data processing. For example, the processor 110 is a CPU. By executing the information processing program stored in the program storage area 131, the processor 110 implements the information processing method for the printing system 1 of the present embodiment in cooperation with a processor 210 (described later) of the multifunction peripheral 200. Through this execution, the processor 110 implements various processes, such as those in FIGS. 2, 7, 10, and 13 described later, including processes for performing data communications with the mobile terminal 300, multifunction peripheral 200, and transaction server 400 connected to the network NT.

The interface 190 is a wired LAN communication interface or a wireless communication interface for communicating with other devices. The interface 190 is connected to the network NT.

<Transaction Server>

The transaction server 400 is installed at a company providing services for settling online payments using a suitable payment application program described later. Although not shown in the drawings, the transaction server 400 has a processor, a storage device, and an interface for connecting to the network NT.

<Multifunction Peripheral>

The multifunction peripheral 200 is owned by a company that provides the printing service described above, for example. The multifunction peripheral 200 includes a scanning unit 280, a printing unit 290, a processor 210, a storage device 215, a display unit 240, a user-operable operating unit 250, and a communication interface 270. The scanning unit 280, printing unit 290, processor 210, storage device 215, display unit 240, operating unit 250, and communication interface 270 are interconnected via a bus 205. The multifunction peripheral 200 is an example of the printing device.

The storage device 215 includes a volatile storage device 220, and a nonvolatile storage device 230. The volatile storage device 220 is DRAM, for example. The volatile storage device 220 has a data storage area 222 for storing image data. The nonvolatile storage device 230 is flash memory, for example. The nonvolatile storage device 230 has a program storage area 232 for storing various programs. Among the various programs stored in the program storage area 232, a printing program that pertains to executing the process in FIGS. 2, 7, 10, 13, and the like described later is prestored in the nonvolatile storage device 230 as firmware, for example.

The processor 210 is a device that performs data processing. The processor 210 is a CPU, for example. By executing the printing program stored in the program storage area 232, the processor 210 implements a printing method according to the printing system 1 of the present embodiment in cooperation with the processor 110 of the data processing server 100. Through this execution, the processor 210 can control the printing unit 290 to form images based on image data sent from the mobile terminal 300. In this specification, the action of forming images on paper may be referred to simply as "printing" or the like as appropriate. The processor 210 is an example of the first controller.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT.

The scanning unit 280 optically reads a document or other scanning target using photoelectric conversion elements, such as CCD or CMOS, and generates image data representing an image of the scanning target.

The printing unit 290 has a conveying mechanism (not shown) for picking up sheets of paper from a sheet-feeding tray and conveying the sheets. The printing unit 290 prints images on sheets according to a prescribed method while conveying the sheets using the conveying mechanism. The following specification describes a case in which printing is performed according to the inkjet method. The sheets of paper are an example of the printing medium.

<Mobile Terminal>

The mobile terminal 300 is a smartphone or other mobile terminal possessed by the user in this example. The mobile terminal 300 connects to the network NT through wireless communication. While not shown in the drawings, the mobile terminal 300 has a processor, a storage device, and an interface for connecting to the network NT. The mobile terminal 300 is an example of the external device. As an alternative to the mobile terminal 300, an information terminal such as a personal computer or a tablet computer may be used as the external device. The mobile terminal 300 is an example of the external device.

<Features of the Embodiment>

In the printing system 1 according to the present embodiment having the above configuration, the mobile terminal 300 attaches a print file that includes image data to an e-mail and transmits the e-mail to the data processing server 100, the data processing server 100 transmits the attached print file to the multifunction peripheral 200, and the multifunction peripheral 200 prints the attached print file. A process related to the payment of printing fees required at that time is implemented through electronic payment. This process will be described at length below.

<Process Flow>

Control procedures executed by the processor 210 of the multifunction peripheral 200, the processor 110 of the data processing server 100, the processor of the transaction server 400, and the processor of the mobile terminal 300 in the present embodiment will be described with reference to FIGS. 2 and 7. Note that references to these processors have been omitted in the following description of FIGS. 2 and 7 and in the description of FIGS. 10 and 13 described later. That is, expressions such as "the processor 210 of the multifunction peripheral 200," "by the processor 210 of the multifunction peripheral 200," and the like are simply expressed as "the multifunction peripheral 200," "by the multifunction peripheral 200," and the like.

<Sending and Receiving Print Jobs>

Figure 2:
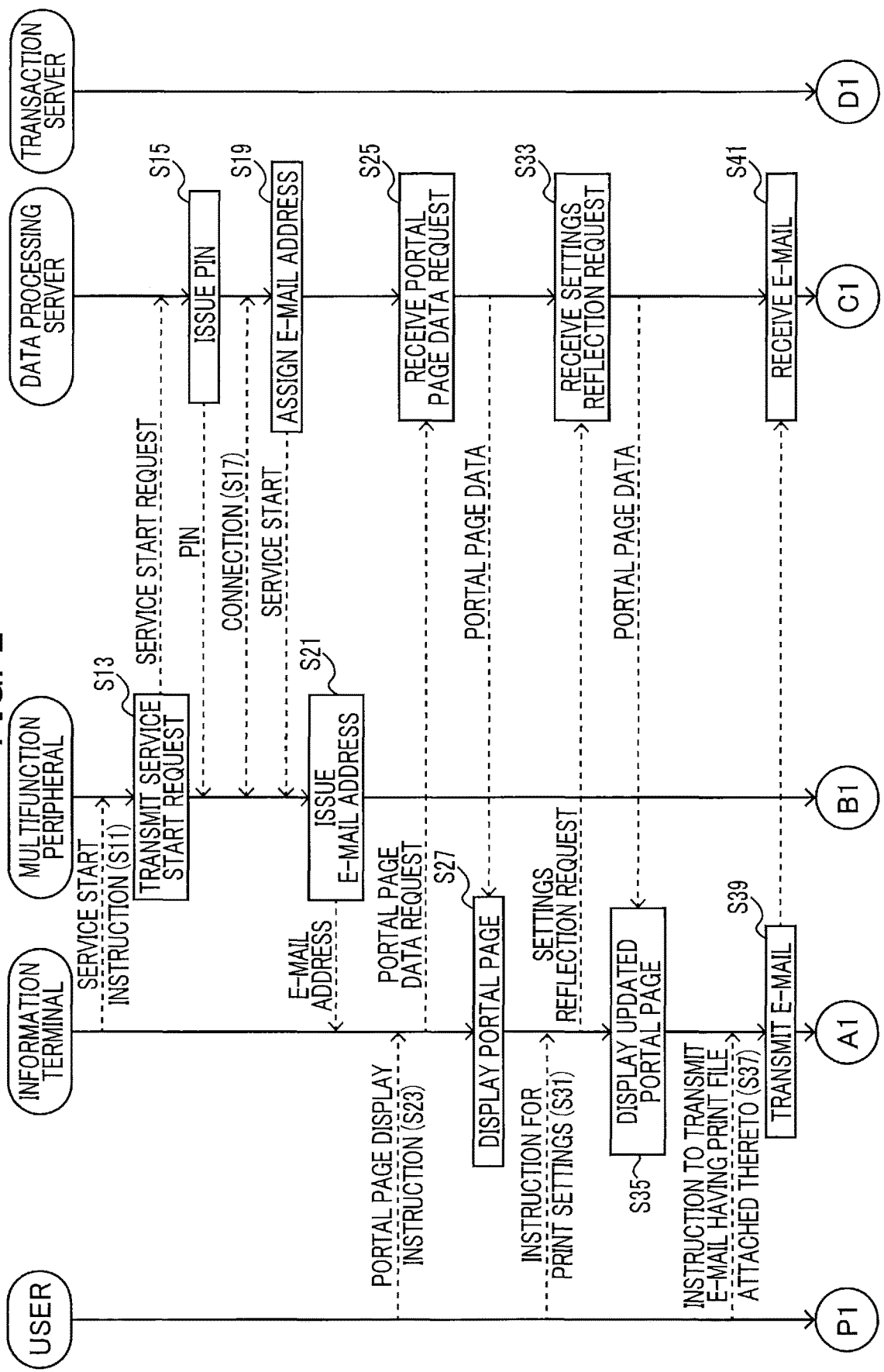
FIG. 2 is a sequence diagram illustrating steps in a process executed by a mobile terminal, a multifunction peripheral, a data processing server, and a transaction server.

In S11 of FIG. 2, the user first performs appropriate operations on the mobile terminal 300 or another suitable terminal, instructing the terminal to connect the multifunction peripheral 200 to the data processing server 100 and to initiate a service according to the information processing method of the embodiment.

Figure 3:
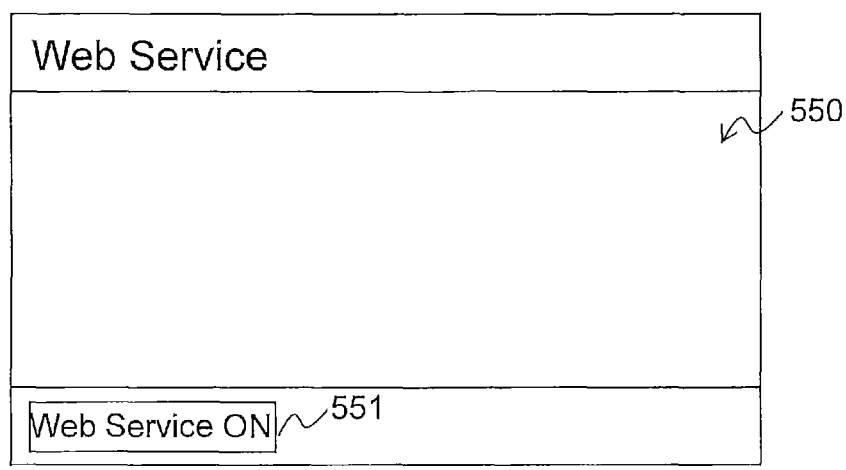
FIG. 3 is a view illustrating an example of a web service page displayed on the mobile terminal and the like by accessing a prescribed URL included in a file for an embedded web server (EWS).

FIG. 3 shows an example in which the user issues the above instruction through a web page displayed based on display data in a file format for an embedded web server (EWS). For example, the multifunction peripheral 200 outputs display data in the EWS file format, and the user accesses a prescribed URL corresponding to the EWS on the mobile terminal 300 or the like to display a web service page 550 shown in FIG. 3. Note that in this specification, "URL" is an abbreviation of Uniform Resource Locator.

The web service page 550 includes a "Web Service ON" button 551. Through suitable operations on the mobile terminal 300 or the like, the user displays the web service page 550 and operates the "Web Service ON" button 551 to transmit a service start instruction from the mobile terminal 300 to the multifunction peripheral 200 in S11. In response to this instruction, in S13 the multifunction peripheral 200 transmits a service start request to the data processing server 100, and then the data processing server 100 receives the service start request. The service start request is an example of the e-mail address request.

Upon receiving this service start request, in S15 the data processing server 100 issues a PIN code and transmits the PIN to the multifunction peripheral 200. In S17 a wireless connection between the multifunction peripheral 200 and the data processing server 100 is established using this PIN code. After the wireless connection has been established, in S19 the data processing server 100 assigns an e-mail address to the multifunction peripheral 200 to initiate the service. The process executed by the data processing server 100 in S19 is an example of the assigning (f). After the service is started in this way, in S21 the multifunction peripheral 200 issues the e-mail address assigned above and transmits the email address to the mobile terminal 300 or the like. Hereinafter, the e-mail address assigned to the multifunction peripheral 200 will simply be referred to as the "e-mail address of the multifunction peripheral 200" for convenience.

Figure 4:
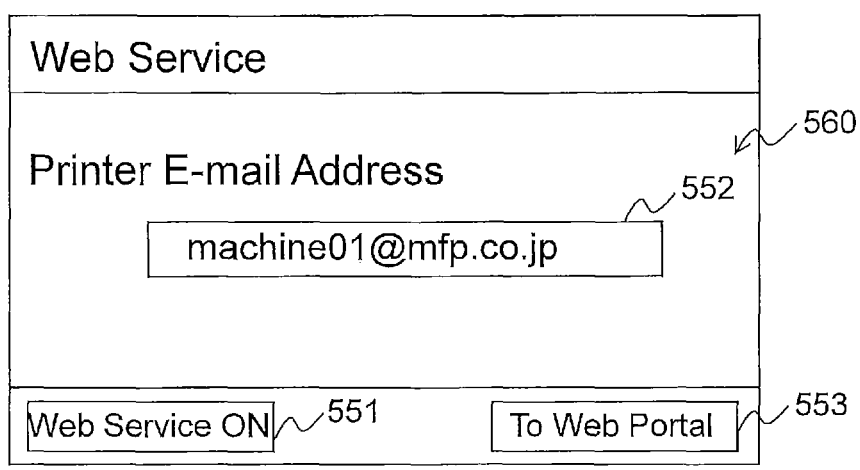

FIG. 4 shows an e-mail address display page 560 displayed on the mobile terminal 300 or the like following the web service page 550 after the "Web Service ON" button 551 was operated. The e-mail address display page 560 shows the email address issued in S21, i.e., the e-mail address received from the multifunction peripheral 200. In addition to the "Web Service ON" button 551, the e-mail address display page 560 also includes an e-mail address display field 552, and a portal site transition button 553 that is a link to a portal site. In this example, the e-mail address "machine01@mfp.cajp" is displayed in the e-mail address display field 552. This is the e-mail address that the data processing server 100 assigned to the multifunction peripheral 200 and that the multifunction peripheral 200 issued and transmitted to the mobile terminal 300. The e-mail address "machine01@mfp.co.jp" is an example of the device e-mail address.

Thereafter, in S23 the user operates the portal site transition button 553 displayed on the mobile terminal 300 and the like to access the URL of a print settings portal page on the portal site and to issue a display instruction requesting the display of this page. The print settings portal page is used for configuring print settings for printing performed on the multifunction peripheral 200. The URL for the print settings portal page is an example of the second URL. Hereinafter, this URL will simply be referred to as the "second URL." In response to this instruction, the mobile terminal 300 transmits a portal page data request to the data processing server 100, and the data processing server 100 receives this request in S25. In response to the portal page data request from the mobile terminal 300, the data processing server 100 outputs to the mobile terminal 300 display data for displaying the print settings portal page corresponding to the portal page data request, and in S27 the mobile terminal 300 displays this print settings portal page for print settings.

Figure 5:
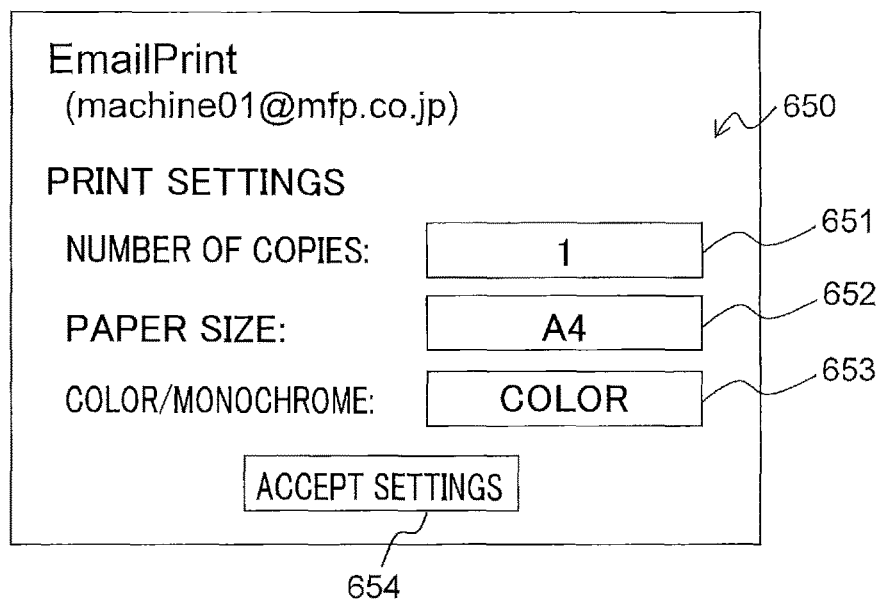
FIG. 5 is a view illustrating an example of a print settings portal page displayed on the mobile terminal.

FIG. 5 shows an example of a print settings portal page 650 displayed on the mobile terminal 300, as described above. The print settings portal page 650 is provided with fields for configuring the print settings described above, including a copy number field 651 for inputting the number of copies to be printed, a paper size field 652 for selecting the paper size, and a color option field 653 for selecting either the color or monochrome setting. In the example of FIG. 5, the number of copies set in the copy number field 651 is "1", the paper size selected in the paper size field 652 is "A4", and the option selected in the color option field 653 is "Color". The content set in each of the fields 651, 652, and 653 is an example of the print setting value.

In addition to the fields 651, 652, and 653, the print settings portal page 650 includes an "Accept Settings" button 654. In S31 the user issues an instruction for print settings by operating the "Accept Settings" button 654 after selecting desired settings in the fields 651, 652, and 653. In response to this instruction, the mobile terminal 300 transmits a request to reflect these settings, and the data processing server 100 receives this request in S33. In response to this request, the data processing server 100 outputs to the mobile terminal 300 display data for the print settings portal page that reflects these print settings, and in S35 the mobile terminal 300 displays the print settings portal page in which the new print settings have been reflected.

Figure 6:
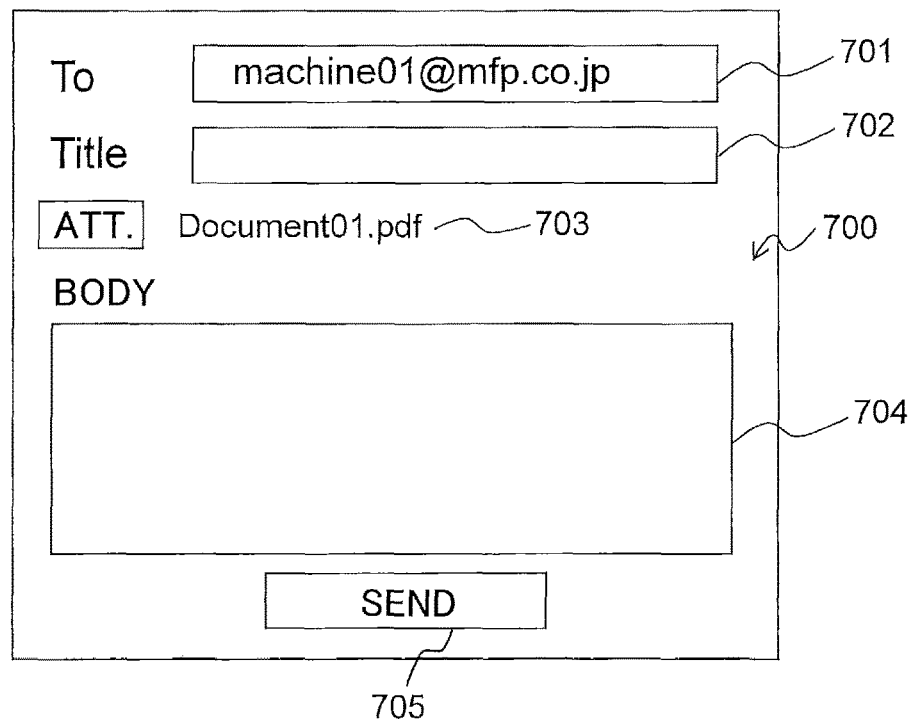
FIG. 6 is a view illustrating an example of an e-mail transmission screen displayed on the mobile terminal.

Through the above process, the print settings used when a print is executed on the multifunction peripheral 200 is complete. In this state, in S37 the user performs suitable operations on the mobile terminal 300 to attach a print file to an e-mail and to transmit the e-mail to the e-mail address received in S21 described above. The print file includes desired image data to be printed on the multifunction peripheral 200. FIG. 6 shows an example of an e-mail transmission screen 700 displayed on the mobile terminal 300 at this time according to suitable e-mail software.

As shown in FIG. 6, the e-mail transmission screen 700 includes an address field 701, a subject field 702, an attachment field 703, a body field 704, and a "Send" button 705.

Using the above example, the e-mail address of the multifunction peripheral 200 "machine01@mfp.cajp" is entered in the address field 701 as the destination. Additionally, the filename "Document01.pdf" is indicated in the attachment field 703. This filename is the name of the print file that is attached to this e-mail and contains image data.

In S37 the user issues an instruction to the mobile terminal 300 to transmit the e-mail with the attached print file "Document01.pdf" by pressing the "Send" button 705 through a suitable operation on the mobile terminal 300. In response to this instruction, in S39 the mobile terminal 300 transmits the e-mail.

As described above, the e-mail address used at this time is the e-mail address that has been assigned to the multifunction peripheral 200 by the data processing server 100. However, the e-mail transmitted to that e-mail address is preconfigured to be received by the data processing server 100 and to be stored in a predetermined area of the data processing server 100. In other words, the e-mail transmitted by the mobile terminal 300 in S39 as described above is received by the data processing server 100 in S41. This e-mail is an example of the first e-mail, and the process executed in S41 is an example of the receiving (a). The format of a print file may be any format that can be printed by the multifunction peripheral 200, such as the JPEG format, PDF format, TIFF format, or GIF format.

Figure 7:
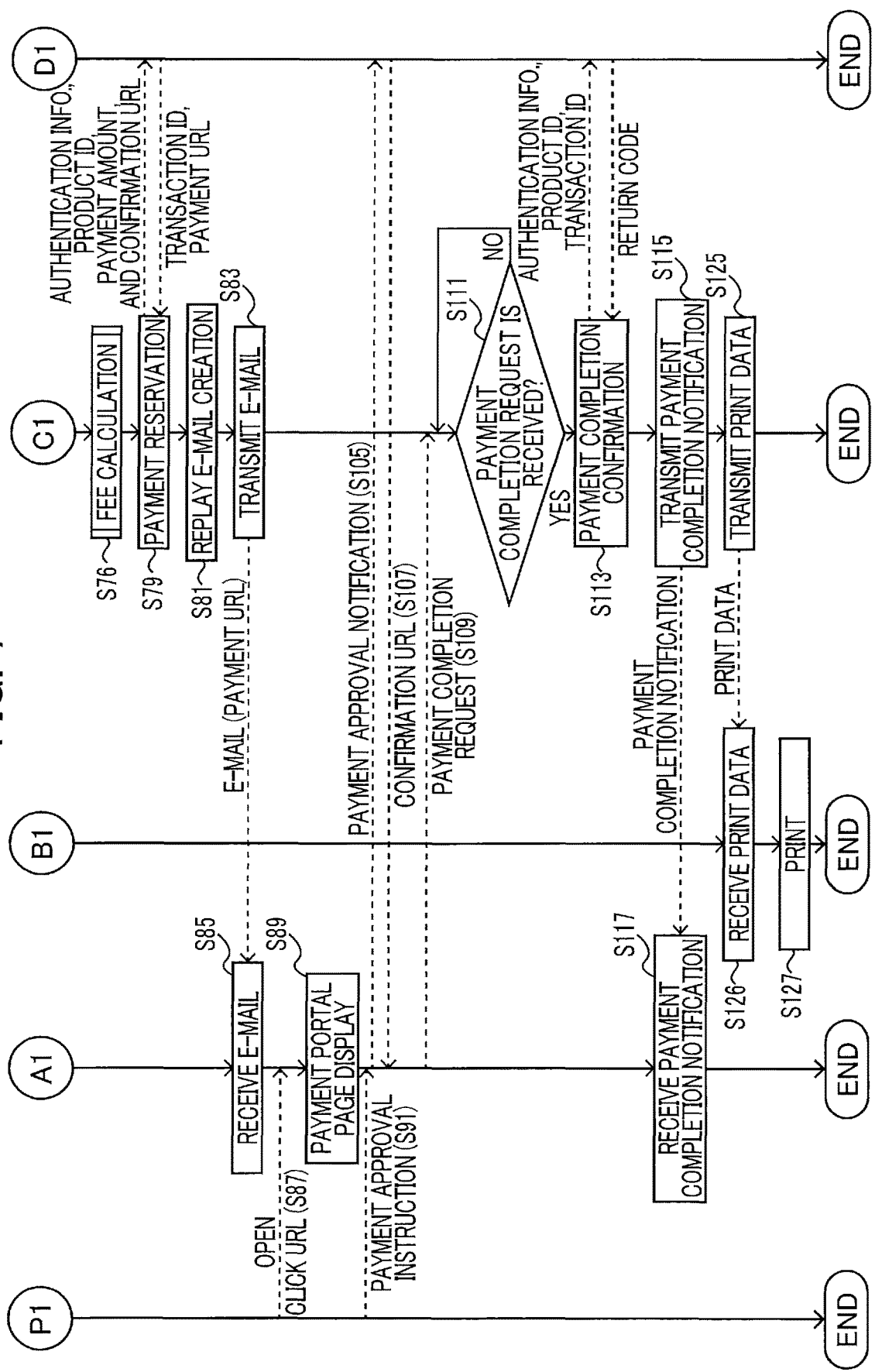
FIG. 7 is a sequence diagram illustrating steps in the process executed by the mobile terminal, the multifunction peripheral, the data processing server, and the transaction server.

Continuing in FIG. 7, in S76 the data processing server 100 analyzes the print file attached to the e-mail received in S41 and calculates a fee to be charged to the user for printing the image data included in that print file. The process executed in S76 is an example of the determining (b). To calculate this fee, the data processing server 100 uses a prescribed fee table stored in the fee table storage area 132 of the volatile storage device 120, for example. In this calculation, the data processing server 100 also takes into account the values of print settings received in S33 for the fields 651, 652, and 653 in the print settings portal page 650, and the like.

Subsequently, in S79 the data processing server 100 performs a payment reservation process. Specifically, the data processing server 100 transmits a product ID issued for execution of the service to print image data in the print file described above, the payment amount for the user that was obtained through the calculation in S76, authentication information to be used for authentication on the transaction server 400, and a confirmation URL for confirming the completion of payment (the URL of the data processing server 100 in the present embodiment) to the transaction server 400. In response to this transmission, the transaction server 400 transmits a payment URL that the user accesses to pay the fee, and a transaction ID related to the fee payment procedure. The data processing server 100 receives the payment URL and transaction ID transmitted from the transaction server 400.

Next, in S81 the data processing server 100 creates a reply e-mail to the mobile terminal 300. The replay e-mail includes the payment amount resulting from the calculation in S76, and the payment URL acquired in S79. This payment amount is an example of the first amount. The payment URL is an example of the first URL. The replay e-mail is an example of the second e-mail. The process executed in S81 is an example of the generating (c).

Figure 8:
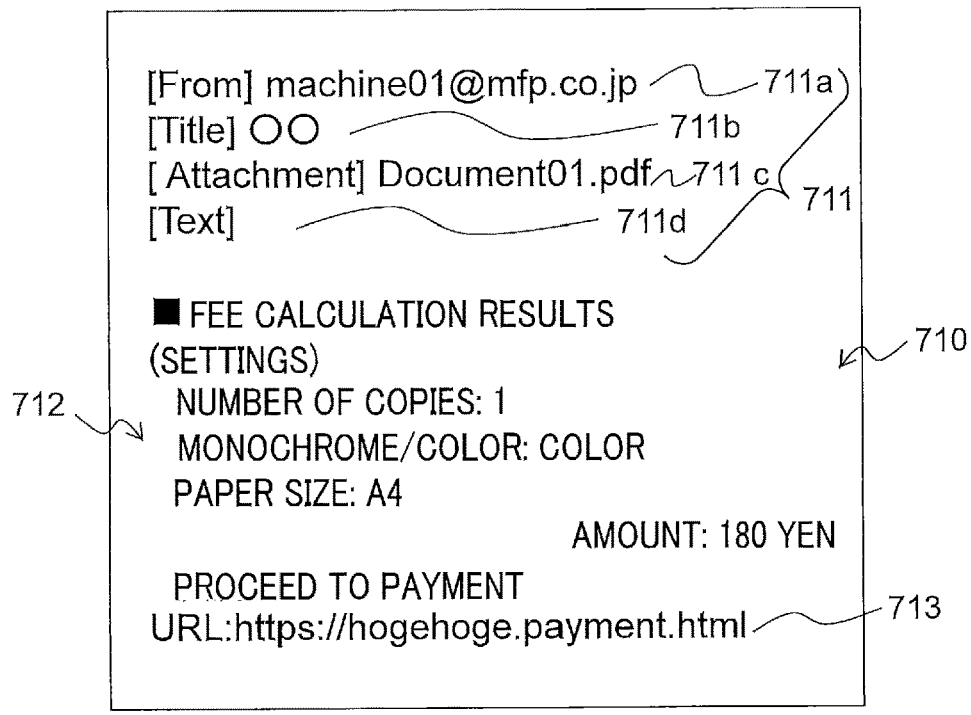
FIG. 8 is a view illustrating an example of an e-mail reception screen displayed on the mobile terminal.

In S83 the data processing server 100 transmits the reply e-mail generated in S81 to the mobile terminal 300 in reply to the e-mail received in S41. Here, the process executed in S83 is an example of the transmitting (d). The mobile terminal 300 receives this reply e-mail in S85. FIG. 8 shows an example of an e-mail reception screen 710 displayed by the e-mail software on the mobile terminal 300 when the reply e-mail received from the data processing server 100 is opened.

As shown in FIG. 8, the e-mail reception screen 710 includes an original e-mail section 711, a calculation results section 712, and a payment URL section 713.

The original e-mail section 711 is an area for displaying an overview of the original e-mail transmitted earlier by the mobile terminal 300. The original e-mail section 711 includes a transmission source field 711a, a subject field 711b, an attachment field 711c, and a body field 711d. Based on the previous example, the e-mail address "machine01@mfp.co.jp" of the multifunction peripheral 200 is displayed in the transmission source field 711a, and the filename "Document01.pdf" is displayed in the attachment field 711c.

The values for print settings in the fields 651, 652, and 653 included in the print settings portal page 650 described above are displayed in the calculation results section 712. In this example, the settings are "1" for the number of copies to be printed, "A4" for the paper size, and "Color" for the color setting. Additionally, the calculation results section 712 also displays the payment amount calculated in S76. In this example, the payment amount is "180 yen."

The payment URL section 713 displays the text "Proceed to Payment" followed by the payment URL, which in this example is the URL "https://hogehoge.payment.html".

In the example shown in FIG. 8, the payment amount calculated in S76 described above and the payment URL described above are included directly in the body of the reply e-mail, but the present invention is not limited to this method. For example, while not shown in the drawings, at least one of the payment amount and payment URL may be provided in the subject field of the reply e-mail or may be listed in the "CC" or "BCC" field. Alternatively, at least one of the payment amount and payment URL may be provided on a web page or the like at a link included in the "CC" or "BCC" field.

Figure 9:
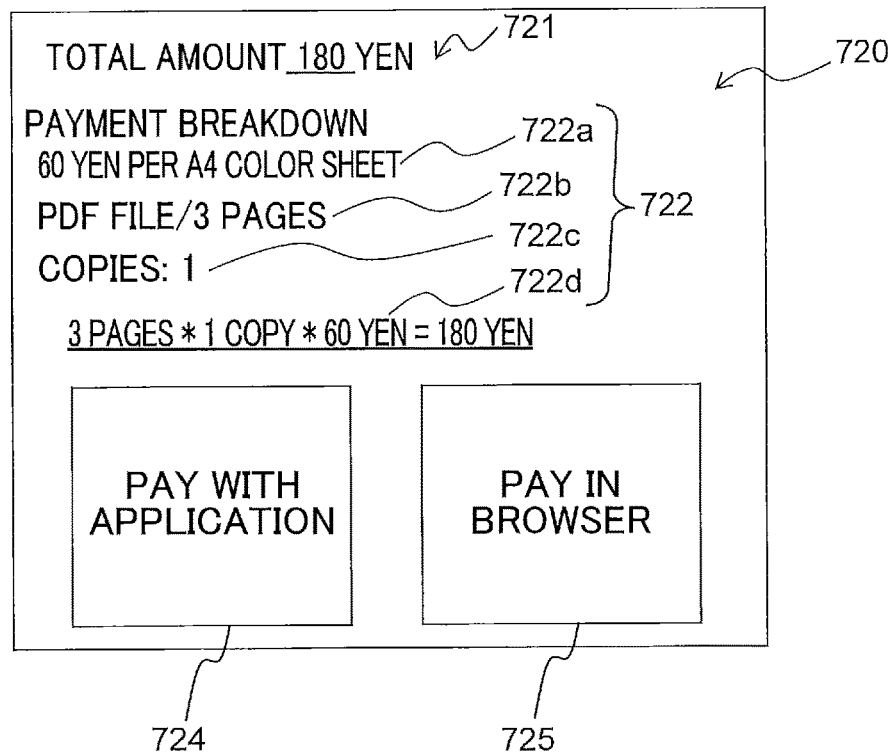
FIG. 9 is a view illustrating an example of a payment portal page displayed on the mobile terminal.

When the user reading the e-mail reception screen 710 clicks on "https://hogehoge.payment.html" in the payment URL section 713 in S87 through an appropriate operation on the mobile terminal 300, in S89 the mobile terminal 300 displays a payment portal page. FIG. 9 shows an example of a payment portal page 720.

As shown in FIG. 9, the payment portal page 720 includes a payment amount field 721, a payment breakdown section 722, a "Pay with Application" button 724, and a "Pay in Browser" button 725. The payment portal page 720 is an example of the payment page.

In keeping with the example described above, the payment amount field 721 displays "180 yen" in this example. The payment breakdown section 722 includes a unit price field 722a, a file format/number of pages field 722b, a number of copies field 722c, and a calculation formula field 722d.

In this example, the unit cost of an A4 size sheet printed in color is 60 yen. Hence, the unit price field 722a displays the text "60 yen per A4 color sheet". The file format/number of pages field 722b displays the text "PDF file/3 pages" based on the above content. The number of copies field 722c displays the text "Copies: 1" to indicate that only one copy is to be printed. The calculation formula field 722d displays the formula used for calculating the fee based on the content displayed in the unit price field 722a, file format/number of pages field 722b, and number of copies field 722c. In accordance with the above example, the formula is "3 pages*1 copy*60 yen=180 yen".

The "Pay with Application" button 724 is a button for executing an online payment using a payment application program for the transaction server 400 described above. The "Pay in Browser" button 725 is a button for executing an online payment through a common browser without using the payment application program for the transaction server 400.

Through the content displayed in the payment portal page 720, the user can see the fee that the user must pay for the current service. By clicking on the "Pay with Application" button 724 in S91 through a suitable operation on the mobile terminal 300, the user accepts the content of the payment amount field 721 and payment breakdown section 722 and issues an instruction for payment approval. As a result, in S105 the mobile terminal 300 transmits a payment approval notification to the transaction server 400 through the payment application program described above. In other words, in S105 the mobile terminal 300 notifies the transaction server 400 of the payment approval through the payment application program. If the user clicks instead on the "Pay in Browser" button 725 in S105, the mobile terminal 300 similar notifies the transaction server 400 of the payment approval through the browser.

After subsequently receiving this notification of approval, in S107 the transaction server 400 transmits to the mobile terminal 300 a confirmation URL corresponding to the payment URL issued during the payment reservation process in S79. Based on this confirmation URL, in S109 the mobile terminal 300 transmits a payment completion request to the data processing server 100. Consequently, in S111 the data processing server 100 determines that a payment completion request was received (S111: YES) and in S113 performs a payment completion confirmation process to confirm payment completion. Specifically, in the payment completion confirmation process, the data processing server 100 transmits to the transaction server 400 the authentication information, product ID, and transaction ID corresponding to the confirmation URL. Subsequently, the data processing server 100 receives a return code from the transaction server 400 in response.

After performing this process in S113 to confirm the completion of payment, in S115 the data processing server 100 transmits a payment completion notification to the mobile terminal 300 and the mobile terminal 300 receives this notification in S117. Further, in S125 the data processing server 100 transmits print data based on the print file received in S41 to the multifunction peripheral 200. Then, the multifunction peripheral 200 receives this print data in S126. This print data may be the data in the print file itself or may be data that was separately rasterized for printing. The process executed in S125 is an example of the transmitting (e). The process executed in S126 is an example of the acquiring (f).

Note that other methods may be used in place of the method described in steps S125 and S126 for transmitting print data directly from the data processing server 100 to the multifunction peripheral 200. For example, in response to receiving a notification from the transaction server 400 confirming the completion of payment, the data processing server 100 may store the print data on a suitable external device connected to the network NT. In this case, the data processing server 100 subsequently transmits to the multifunction peripheral 200 a data acquisition instruction including access information such as the URL for the external device. Upon receiving this data acquisition instruction from the data processing server 100, the multifunction peripheral 200 accesses the external device through the network NT and acquires the print data from the external device. In the above case, the access information is an example of the storage destination information, the process in which the data processing server 100 transmits the data acquisition instruction is an example of the transmitting (e), and the process in which the multifunction peripheral 200 acquires the print data from the external device is an example of the acquiring (f).

In S127 the multifunction peripheral 200 controls the printing unit 290 to print image data corresponding to the print data received in S126 on paper. At this time, printing is performed based on the print settings in the fields 651, 652, and 653 included in the print settings portal page 650 received described above. The process executed in S127 is an example of the controlling (g). This ends the process flow described above.

<Effects of the Embodiment>

As described above, the printing system 1 of the present embodiment implements e-mail printing. That is, the mobile terminal 300 transmits to the data processing server 100 an e-mail which has an attached file for printing and is addressed to the e-mail address that has been assigned to the multifunction peripheral 200 (S39). Subsequently, the data processing server 100 calculates a fee to be charged for printing based on the print file attached to this e-mail (S76). Next, the data processing server 100 generates a reply e-mail noting the amount of the calculated fee and a payment URL for accessing the payment portal page 720 in order to pay the fee and transmits this reply e-mail to the mobile terminal 300 in response (S83). Using the mobile terminal 300, the user can access the payment URL included in this reply e-mail received by the mobile terminal 300 to pay the amount of the fee charged for printing through electronic payment. Once payment has been completed in this way, the data processing server 100 transmits print data based on the print file to the multifunction peripheral 200 (S125). As a result, the multifunction peripheral 200 can acquire this print data and print the corresponding images on paper (S127).

As described above, when paying a fee charged for e-mail printing through electronic payment in the present embodiment, the user can learn the amount to be paid in advance by accessing the URL provided in the e-mail. As a result, the present embodiment can improve user convenience.

One feature of the present embodiment is that the user can access the second URL for the print settings portal page 650 in S23 before the data processing server 100 receives the e-mail for printing from the mobile terminal 300. By accessing the second URL with the mobile terminal 300 or the like, the user can open the print settings portal page 650 and set desired print settings (desired print setting values) for printing the print file in the print settings portal page 650.

Another feature of the present embodiment is that when the multifunction peripheral 200 transmits a service start request to the data processing server 100 (S13) in response to a service start instruction from the user (S11), the data processing server 100 assigns an e-mail address to the multifunction peripheral 200 (S19). This facilitates the subsequent execution of an e-mail print using transmission of an e-mail addressed to this e-mail address.

Another feature of the present embodiment is that the payment URL is included in the body of the reply e-mail rather than the subject or address line of the reply e-mail, as shown in the e-mail reception screen 710 of FIG. 8. In this way, the user can receive and display the reply e-mail on the mobile terminal 300 and, while reading the content of the body of the e-mail, can easily access the web page referenced by this URL, i.e., the payment portal page 720, through a single operation on the payment URL included in the body (S87, S89).

<Variations of the Embodiment>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below, wherein like parts and components are designated with the same reference numerals and duplicate description are omitted or simplified as appropriate.

(1) Variation where Print Settings can be Changed in the Reply E-Mail

Figure 10:
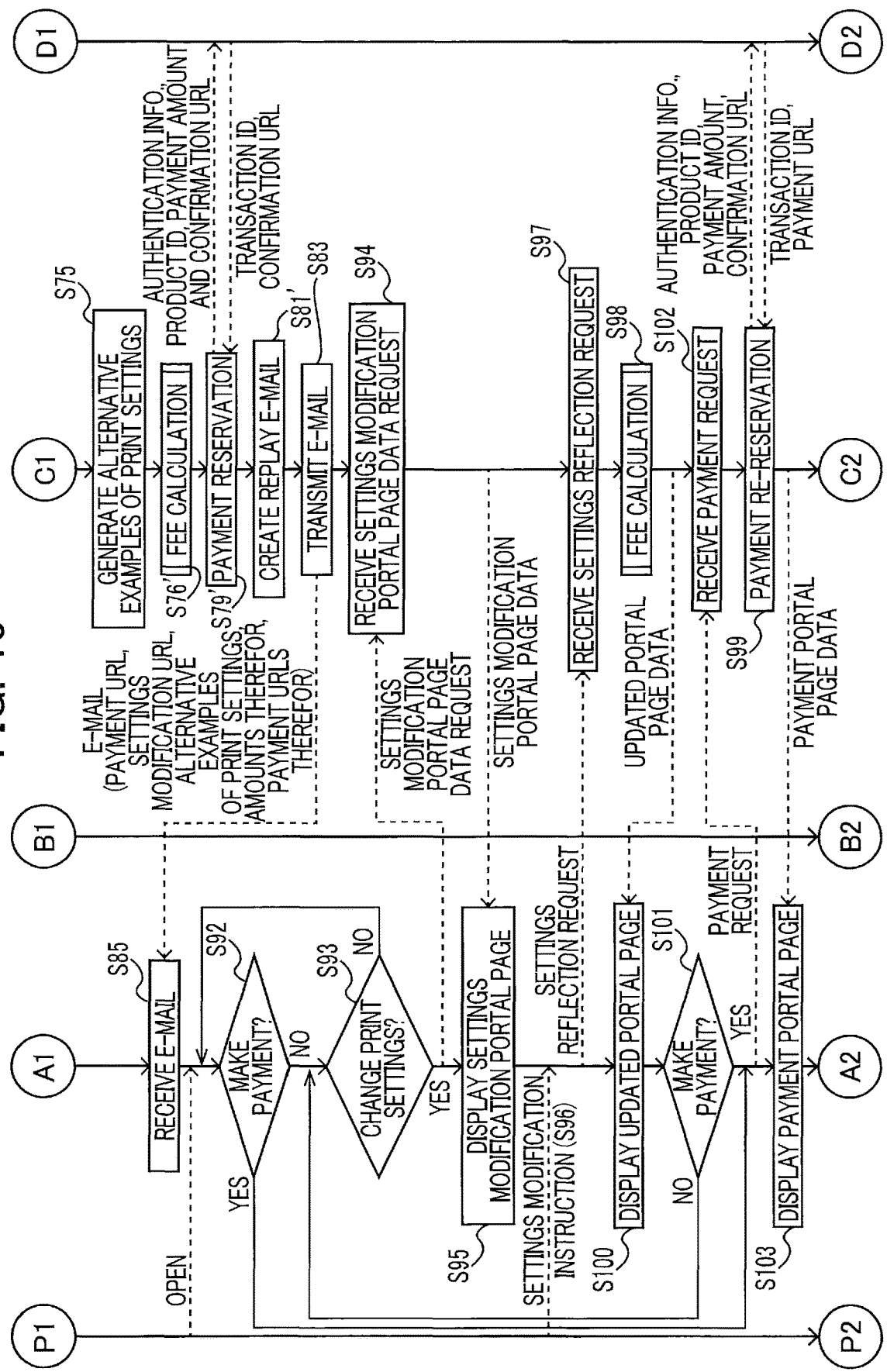
FIG. 10 is a sequence diagram illustrating steps in a process executed by a mobile terminal, a multifunction peripheral, a data processing server, and a transaction server, wherein print settings values can be modified in a reply e-mail.

FIG. 10 shows the control procedure of the present variation that represents the main portion of the process executed by the processor 210 of the multifunction peripheral 200, the processor 110 of the data processing server 100, the processor of the transaction server 400, and the processor of the mobile terminal 300.

In this variation, first the same steps S11-S41 in FIG. 2 are executed. In other words, after the print settings are configured, the mobile terminal 300 transmits an e-mail with an attached print file to the e-mail address assigned to the multifunction peripheral 200, and the data processing server 100 receives this e-mail in S41. Following step S41, in S75 of FIG. 10 according to the present variation, the data processing server 100 generates one or more alternative examples according to a suitable method for changing the print settings (print setting values) received from the mobile terminal 300 in S33 of FIG. 2. These alternative examples will be described later in greater detail.

In S76', which corresponds to S76 in FIG. 7, the data processing server 100 calculates the amount of charge for printing image data included in the print file that was attached to the e-mail received in S41 based on the values of print settings received in S33. As in the embodiment described above, this amount is an example of the first amount and will be referred to simply as the "first amount" in this variation. Further, in S76' the data processing server 100 also calculates the amount to be charged for printing the same image data when applying each alternative example of the print settings generated in S75 described above. The amount when applying each alternative example is an example of the second amount. Hereinafter, this amount will simply be referred to as the "second amount" in this variation. The process executed in S76' in this variation is an example of the determining (b).

Next, in S79', which corresponds to S79 in FIG. 7 described above, the data processing server 100 performs the same payment reservation process. Specifically, the data processing server 100 transmits the product ID and authentication information described above, the first amount and one or more second amounts calculated in S76', and a confirmation URL for confirming the completion of payment to the transaction server 400. In response to this transmission, the data processing server 100 receives a payment URL for paying the first amount, one or more payment URLs for paying the one or more second amounts, and a transaction ID, which have been transmitted from the transaction server 400. As in the embodiment described above, the payment URL for paying the first amount is an example of the first URL. In this variation, this payment URL will be referred to as the "first payment URL" for convenience. Further, the one or more payment URLs for paying the one or more second amounts are each an example of the fourth URL. In the present variation, these payment URLs will be referred to as the "fourth payment URL" for convenience.

Next, in S81', which corresponds to S81 of FIG. 7 described above, the data processing server 100 creates a reply e-mail for the mobile terminal 300 that includes the first amount and the first payment URL acquired in S79'. The data processing server 100 also includes in the reply e-mail details of the one or more alternative examples of print settings (print setting values) generated in S75, the one or more second amounts corresponding to the one or more alternative examples, and the one or more fourth payment URLs acquired in S79' for paying these second amounts. Additionally, in S81' the data processing server 100 includes in the reply e-mail a URL with which the user can access a portal page for making desired changes in the print settings received in S33 related to the first amount. This URL is an example of the third URL. In the present variation, this URL will be referred to as the "third URL" for convenience.

In S83 the data processing server 100 transmits the reply e-mail generated in S81' to the mobile terminal 300 in reply to the e-mail received in S41, as in FIG. 7 described above. In this variation, the process executed in S83 is an example of the transmitting (d). As in FIG. 7, the reply e-mail is received by the mobile terminal 300 in S85.

Figure 11:
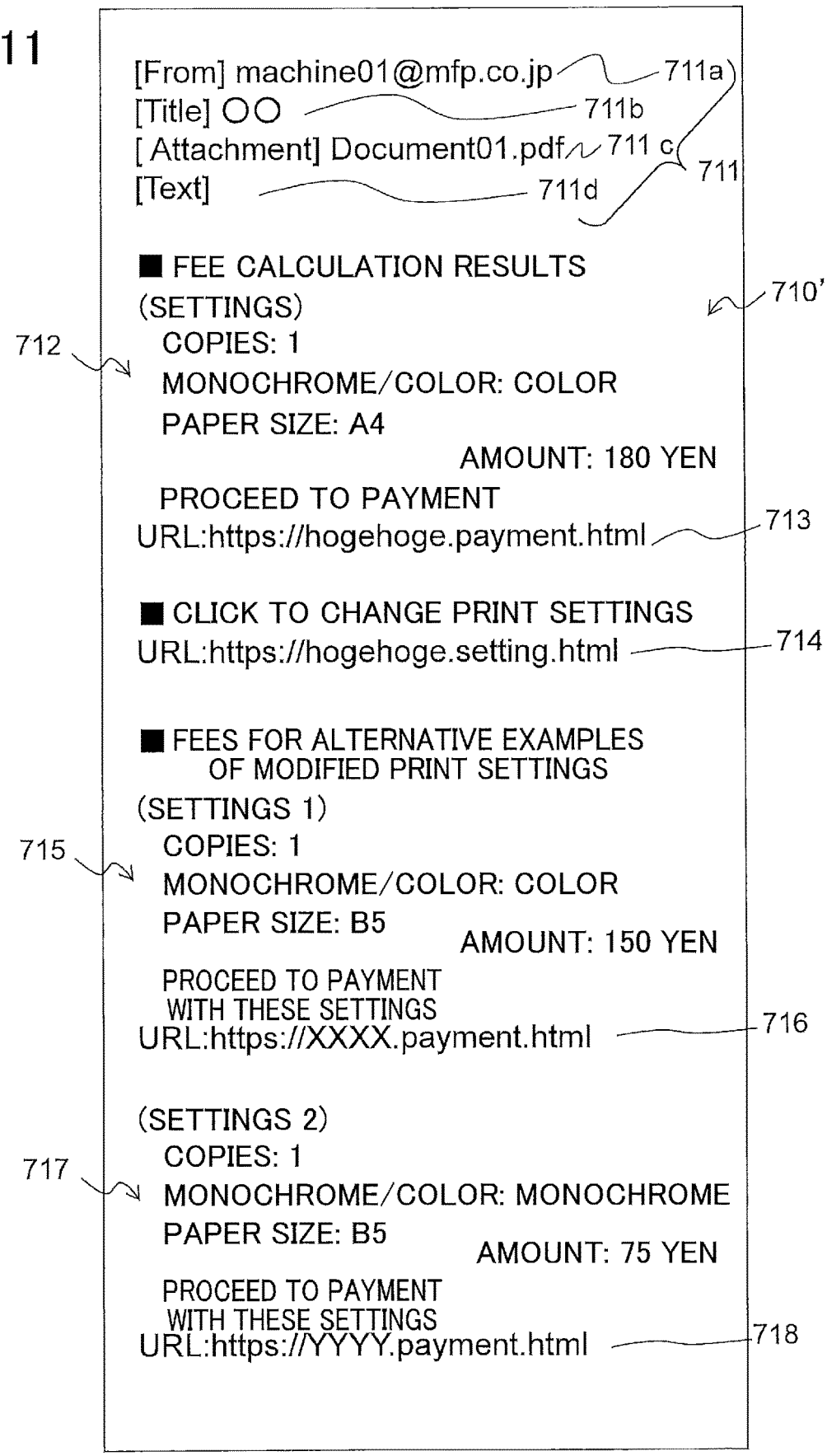
FIG. 11 is a view illustrating an example of an e-mail reception screen displayed on the mobile terminal.

FIG. 11, corresponding to FIG. 8 in the above embodiment, shows an example of an e-mail reception screen 710' displayed on the mobile terminal 300 by the above-described e-mail software when the reply e-mail is opened.

As shown in FIG. 11, the e-mail reception screen 710' includes the same original e-mail section 711 and calculation results section 712 as those in the e-mail reception screen 710 shown in FIG. 8. Since the original e-mail section 711 and calculation results section 712 are identical to those in the e-mail reception screen 710 of FIG. 8, a description of these fields will not be repeated. Below, when describing content in the reply e-mail, fields such as the original e-mail section 711 and calculation results section 712 in the e-mail reception screen 710' may be simply referred to as "sections of the reply e-mail."

<When Making a Payment without Changing the Original Print Settings>

The e-mail reception screen 710' also has the payment URL section 713 shown in the e-mail reception screen 710 of FIG. 8 for displaying the first payment URL. In this variation, if the user decides not to modify print settings as described below after confirming the content of the original e-mail section 711 and calculation results section 712, the user clicks on "https://hogehoge.payment.html" in the payment URL section 713. Accordingly, in S92 following step S85 described above, the mobile terminal 300 determines that the user wishes to make a payment (S92: YES) and transmits a payment request, which the data processing server 100 receives in S102.

Upon receiving this request, in S99 the data processing server 100 executes a payment re-reservation process. That is, since the user has approved the first amount described above, in S99 the data processing server 100 repeats the process related to the first amount described in S79' of FIG. 10. Thus, the data processing server 100 transmits the product ID and authentication information described above, the first amount calculated in S76', and a confirmation URL for confirming the completion of payment to the transaction server 400 and receives a first payment URL and a transaction ID from the transaction server 400.

Figure 12A:
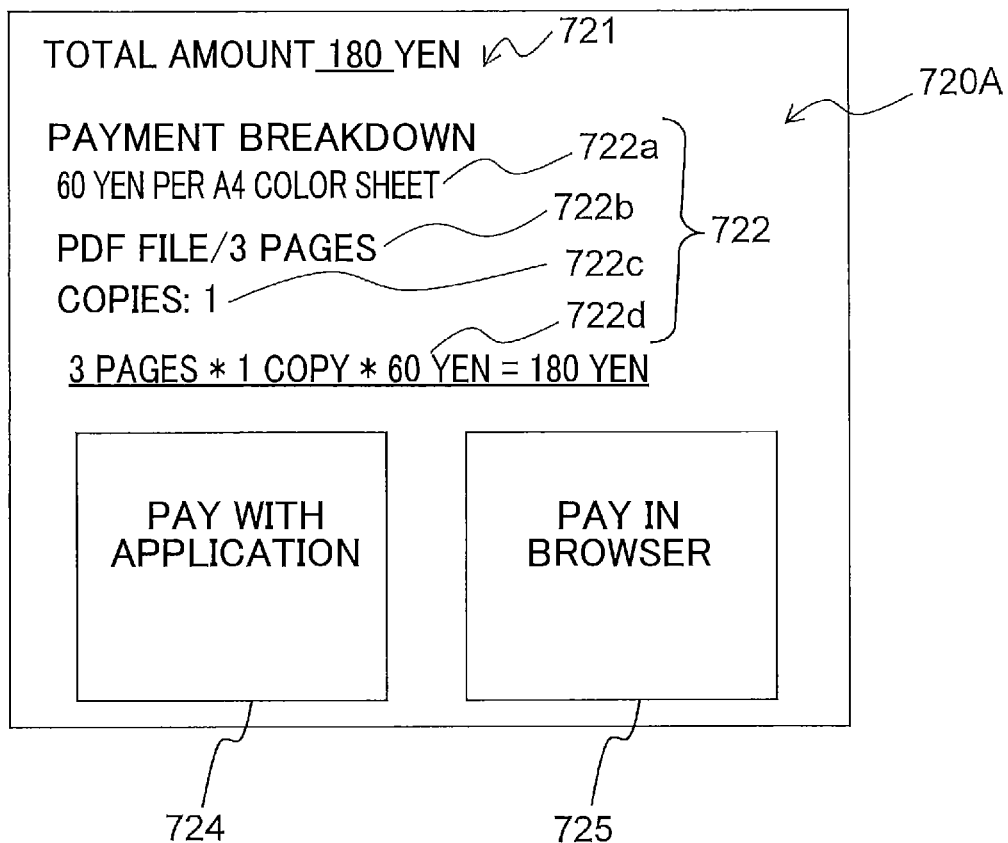
FIG. 12A is a view illustrating an example of a payment portal page displayed on the mobile terminal.

Subsequently, the data processing server 100 outputs display data to the mobile terminal 300 for displaying a payment portal page corresponding to the payment request received in S102, and in S103 the mobile terminal 300 displays this payment portal page. FIG. 12A, which corresponds to FIG. 9 in the embodiment, shows an example of a payment portal page 720A in the present variation.

As shown in FIG. 12A, the content of the payment portal page 720A is identical to the content of the payment portal page 720 in FIG. 9. That is, as in the example of FIG. 9, "180 yen" is displayed in the payment amount field 721. Further, in the payment breakdown section 722, "60 yen per A4 color sheet" is displayed in the unit price field 722*a*, "PDF file/3 pages" is displayed in the file format/number of pages field 722*b*, and "Copies: 1" is displayed in the number of copies field 722*c*. Further, "3 pages*1 copy*60 yen=180 yen" is displayed in the calculation formula field 722*d*. As in FIG. 9, the payment portal page 720A is provided with the "Pay with Application" button 724 and "Pay in Browser" button 725. In this variation, the payment portal page 720A is an example of the payment page.

By clicking on either the "Pay with Application" button 724 or "Pay in Browser" button 725 in S91 of FIG. 13, the user issues an instruction to approve the payment, and in S105 the mobile terminal 300 transmits a payment approval notification to the transaction server 400.

<When Modifying Print Settings to Desired Ones>

Returning to FIG. 11, the e-mail reception screen 710' is further provided with a print settings modification URL section 714 displaying the third URL. In this example, the third URL is "https://hogehoge.setting.html". If the user decides to change the values for print settings after confirming the content of the original e-mail section 711 and calculation results section 712, the user clicks on "https://hogehoge.setting.html" in the print settings modification URL section 714. As a consequence, in S92, following step S85 described above, the mobile terminal 300 determines that a payment is not to be made (S92: NO), and subsequently in S93 determines that the user wishes to modify print settings (S93: YES). As a result, the mobile terminal 300 transmits a request for settings modification portal page data, which the data processing server 100 receives in S94. The data processing server 100 outputs display data for the portal page corresponding to this request to the mobile terminal 300, and the mobile terminal 300 displays the settings modification portal page in S95.

Figure 12B:
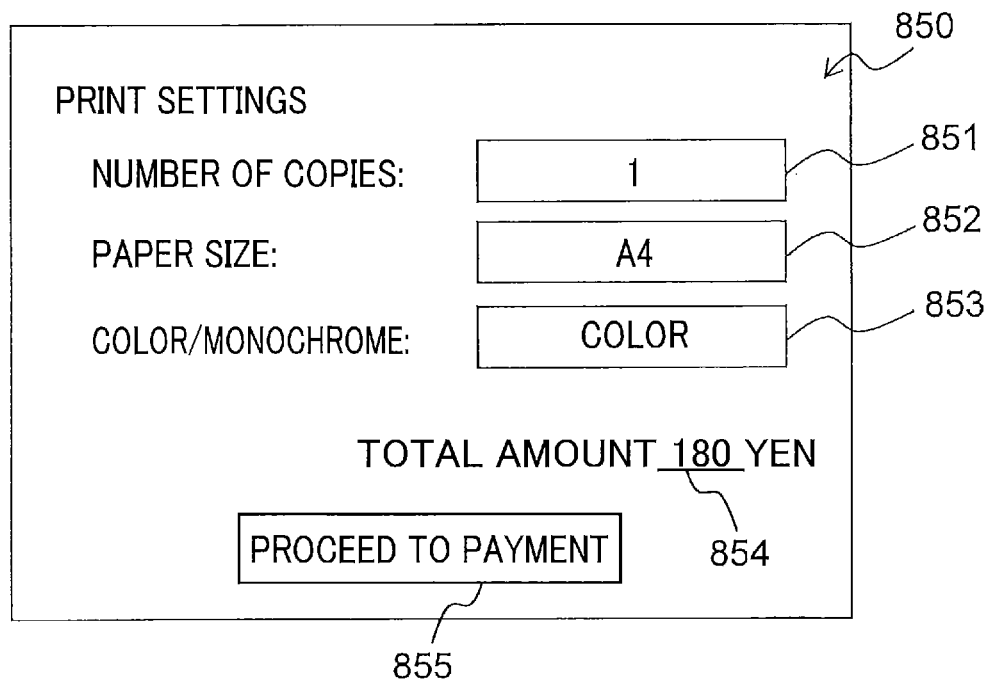
FIG. 12B is a view illustrating an example of a settings modification portal page displayed on the mobile terminal.

FIG. 12B shows an example of a settings modification portal page 850 displayed on the mobile terminal 300. As in FIG. 5 described above, the settings modification portal page 850 has fields for revising the above print settings, including a copy number field 851 for inputting the number of copies to be printed, a paper size field 852 for selecting the paper size, and a color option field 853 for selecting either the color or monochrome setting. The example in FIG. 12B shows the state of settings before the user has made any changes. Thus, in keeping with the example described above, the number of copies set in the copy number field 851 is "1", the paper size selected in the paper size field 852 is "A4", and the option selected in the color option field 853 is "Color". The content in each of the fields 851, 852 and 853 is an example of the print setting value. The settings modification portal page 850 is an example of the settings modification page.

The settings modification portal page 850 is further provided with an amount due field 854 showing the amount of charges corresponding to the content in the fields 851, 852, and 853. In FIG. 12B, the amount due field 854 displays "180 yen", which is the amount calculated in S76' described above for the print settings 1 copy, A4 size, and color printing prior to any changes being made.

From this state, if the user modifies the content of even one of the fields 851, 852, and 853 through a suitable operation on the mobile terminal 300, in S96 an instruction to modify the print setting is issued, and the mobile terminal 300 transmits a request to reflect this modified setting. In S97 the data processing server 100 receives the request from the mobile terminal 300. In S98 the data processing server 100 recalculates the fee for printing based on the modified settings according to the same method described in S76' and outputs display data for a portal page reflecting both the modified settings and the recalculated fee to the mobile terminal 300. Upon receiving the display data, in S100 the mobile terminal 300 displays the portal page reflecting the modifications.

Figure 14A:
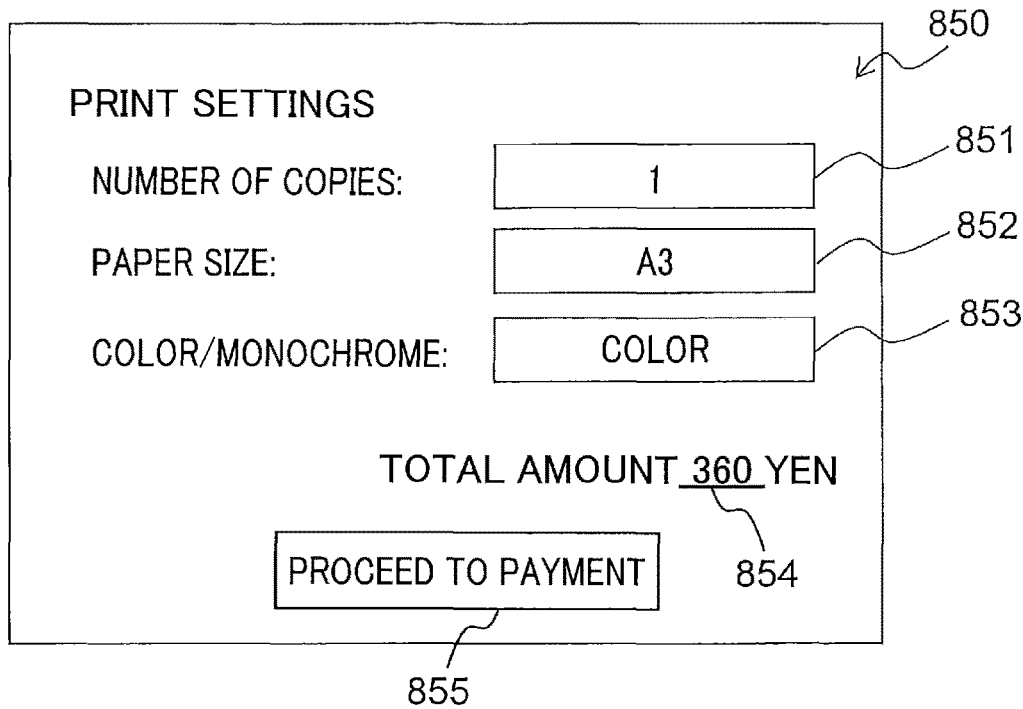
FIG. 14A is a view illustrating another example of the settings modification portal page displayed on the mobile terminal.

FIG. 14A shows an example of the settings modification portal page 850 described above after the content in the paper size field 852 was modified from the state shown in FIG. 12B to "A3" size. In this case, the value displayed in the amount due field 854 has changed from "180 yen" to "360 yen" due to the change in paper size.

Figure 14B:
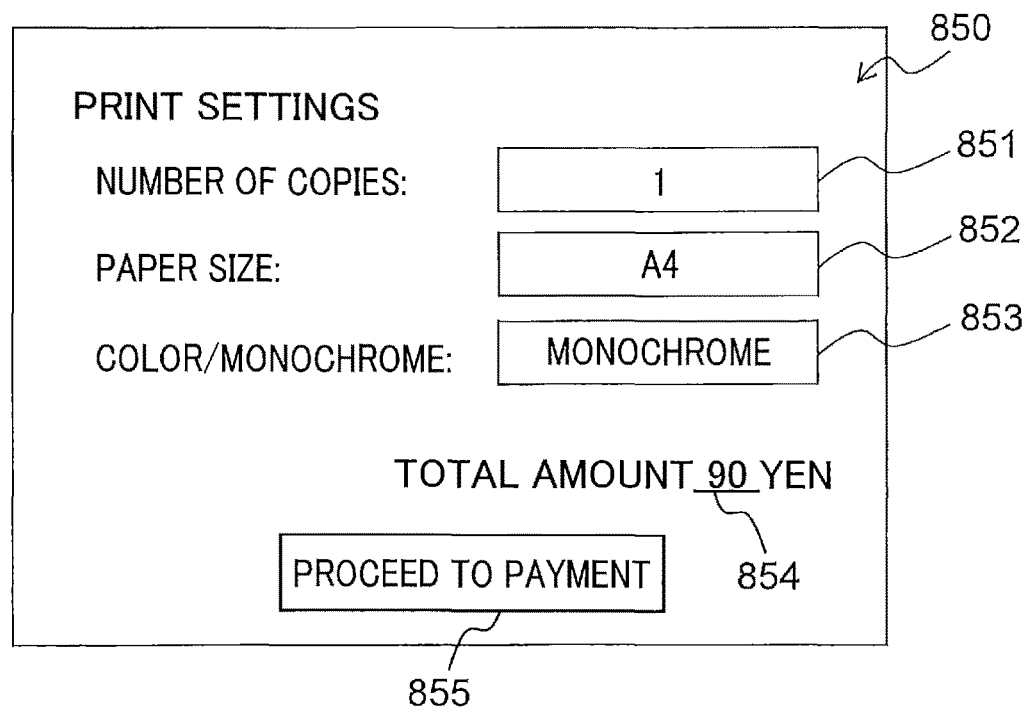
FIG. 14B is a view illustrating another example of the settings modification portal page displayed on the mobile terminal.

FIG. 14B shows an example of the settings modification portal page 850 described above when the content in the color option field 853 was modified from the state shown in FIG. 12B to "Monochrome". In this case, the amount displayed in the amount due field 854 has changed from "180 yen" to "90 yen" due to the change in the color option.

As shown in FIGS. 14A and 14B, the settings modification portal page 850 reflecting this modified content is further provided with a "Proceed to Payment" button 855. When the user operates the "Proceed to Payment" button 855, in S101, following step S100 described above, the data processing server 100 determines that the user wishes to make a payment (S101: YES). Accordingly, the mobile terminal 300 transmits a payment request to the data processing server 100, as described above, and the data processing server 100 receives this request in S102 and executes the payment re-reservation process in S99.

Next, the data processing server 100 outputs display data for a payment portal page corresponding to the payment request received in S102 to the mobile terminal 300, and the mobile terminal 300 displays this payment portal page in S103. This payment portal page is similar to the page shown in FIG. 12A described above and allows the user to make final confirmation of the fee to be charged based on the modified print settings described above. By clicking on one of the "Pay with Application" button 724 and "Pay in Browser" button 725 described above, in S91 of FIG. 13 the user issues an instruction to approve payment, and in S105 the mobile terminal 300 transmits a payment approval notification to the transaction server 400.

On the other hand, if the user does not operate the "Proceed to Payment" button 855 in the settings modification portal page 850 (S101: NO), the mobile terminal 300 returns to S93 and repeats the process described above.

<Description of Sample Modifications to the Print Settings>

Referring back to FIG. 11, the e-mail reception screen 710' is provided with alternative example sections 715 and 717 showing alternative examples of modified print settings.

In this example, the original content illustrated in the calculation results section 712 prior to modifications includes a number of copies of "1", a paper size of "A4", and a color option of "Color", while the alternative example section 715 shows an example in which the paper size has been modified to "B5". As a result of this change, the alternative example section 715 also indicates that the amount payable has changed to "150 yen".

The alternative example section 717 shows an example in which the color option has been changed to "Monochrome" in addition to the above change in paper size, and consequently the amount payable has changed to "75 yen" as a result of these changes.

Further, payment URL sections 716 and 718 including the fourth payment URLs described above are respectively provided at the bottoms of the alternative example sections 715 and 717. The payment URL section 716 includes the text "Proceed to Payment with these Settings" and the URL "https://XXXX.payment.html", which is the content of the fourth payment URL in this example. If a user having viewed the content of the alternative example section 715 wishes to change the current settings to that alternative example and proceed to payment, the user clicks on "https://XXXX.payment.html" in the payment URL section 716. If the user having viewed the content of the alternative example section 717 wishes to change the current settings to that alternative example and proceed to payment, the user clicks on "https://YYYY.payment.html" in the payment URL section 718.

When the user clicks on one of the above links, the mobile terminal 300 determines in S92 that payment is to be made (S92: YES) and transmits a payment request, which the data processing server 100 receives in S102. Accordingly, the data processing server 100 executes the payment re-reservation process in S99. Hence, since the user has given approval for the second amount in this case, the data processing server 100 performs the same process as that described above in S79' of FIG. 10 for the second amount. That is, the data processing server 100 transmits the product ID and authentication information described above, the second amount calculated in S76', and a confirmation URL for confirming the completion of payment to the transaction server 400 and receives a fourth payment URL and a transaction ID.

After completing the process in S99, the data processing server 100 outputs display data to the mobile terminal 300 for a payment portal page corresponding to the payment request received in S102, and in S103 the mobile terminal 300 displays this payment portal page.

Figure 15A:
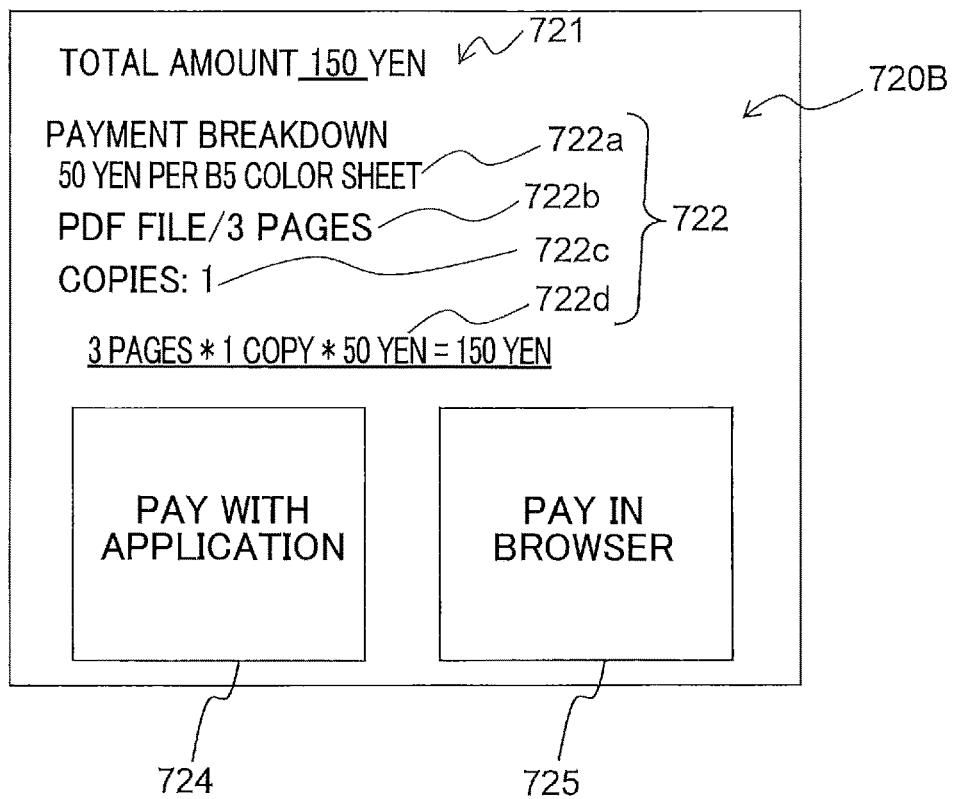
FIG. 15A is s a view illustrating another example of the payment portal page displayed on the mobile terminal.

FIG. 15A, which corresponds to FIG. 12A described above, shows an example of a payment portal page 720B displayed in S103 when the user has clicked on "https://XXXX.payment.html" in the payment URL section 716. In the payment portal page 720B shown in FIG. 15A, "150 yen" is displayed in the payment amount field 721 on the basis of the content of the alternative example section 715. In the payment breakdown section 722, "50 yen per B5 color sheet" is displayed in the unit price field 722a, "PDF file/3 pages" is displayed in the file format/number of pages field 722b, and "Copies: 1" is displayed in the number of copies field 722c. Further, the formula "3 pages*1 copy*50 yen=150 yen" is displayed in the calculation formula field 722*d*. The payment portal page 720B is also provided with the "Pay with Application" button 724 and "Pay in Browser" button 725.

Figure 15B:
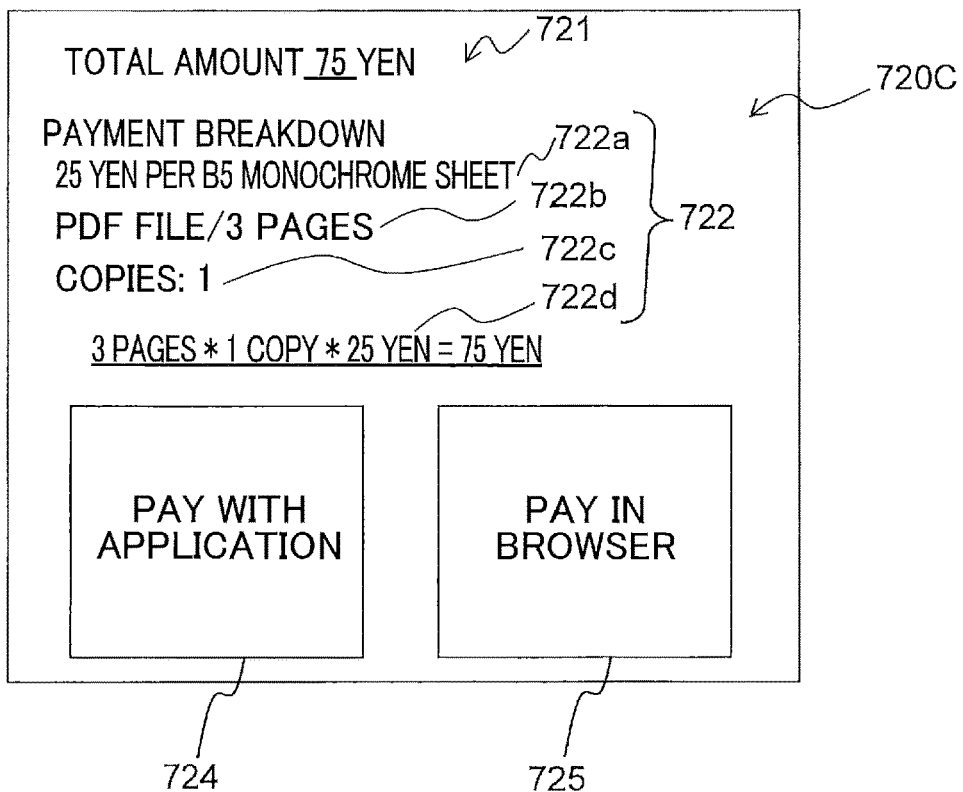
FIG. 15B is s a view illustrating another example of the payment portal page displayed on the mobile terminal.

FIG. 15B, which corresponds to FIG. 12A described above, shows an example of a payment portal page 720C displayed in S103 when the user has clicked on "https://YYYY.payment.html" in the payment URL section 718. In the payment portal page 720C shown in FIG. 15B, "75 yen" is displayed in the payment amount field 721 on the basis of the content of the alternative example section 717. In the payment breakdown section 722, "25 yen per B5 monochrome sheet" is displayed in the unit price field 722*a*, "PDF file/3 pages" is displayed in the file format/number of pages field 722*b*, and "Copies: 1" is displayed in the number of copies field 722*c*. Further, the formula "3 pages*1 copy*25 yen=75 yen" is displayed in the calculation formula field 722*d*. As in the payment portal page 720A described above, the payment portal page 720C is also provided with the "Pay with Application" button 724 and "Pay in Browser" button 725. The payment portal pages 720B and 720C are each an example of the payment page.

By clicking on the "Pay with Application" button 724 or "Pay in Browser" button 725 in the payment portal page 720B of FIG. 15A or the payment portal page 720C of FIG. 15B, the user issues an instruction to approve the payment in S91 of FIG. 13, as described above. In S105 the mobile terminal 300 transmits a payment approval notification to the transaction server 400.

The remaining process from S107 in FIG. 13 following completion of the steps through S105 of FIG. 13 described above is identical to that in FIG. 7 of the embodiment and, hence, a description of these steps will be omitted. The printing that is executed in S127 is based on the values for print settings that have been modified as described above.

<Effects of the Variation>

The variation having the above configuration obtains the same effects as the embodiment described above.

In addition to the effects described above, one feature of the present variation is that the reply e-mail generated by the data processing server 100 includes a third URL in the print settings modification URL section 714 as a link to the settings modification portal page 850 in addition to the first payment URL provided in the payment URL section 713. Providing both the first payment URL and the third URL enables the user to proceed to the payment process by accessing the first payment URL when the user feels no particular need to change the current print settings and to access the third URL when the user wishes to change the current print settings. In other words, the user can easily select either the first payment URL or the third URL through a single operation in the e-mail reception screen 710' displayed when the reply e-mail is opened on the mobile terminal 300. As a result, the present variation can reliably improve user convenience.

Another feature of this variation is that at least one alternative example of print settings is included in the alternative example sections 715 and 717 of the reply e-mail. In this way, if the user wishes to modify the current print settings even slightly, the user can reference the alternative examples to consider different ways that the settings can be changed.

Another feature of the present variation is that the alternative example sections 715 and 717 in the reply e-mail include both an alternate example of the print settings, and the second amount of the fee to be charged when printing according to the alternative example. Thus, the user can also reference these fee amounts when considering different ways to modify the print settings.

Another feature of the present variation is that the payment URL sections 716 and 718 in the reply e-mail each include a fourth URL for paying the second amount of the fee related to the corresponding alternative example of the print settings. Accordingly, when a user wishes to change the values of print settings to those in an alternative example and pay the amount to be charged for that alternative, the user can easily change the print settings to the alternative example and pay the fee through a single operation on the fourth URL while the reply e-mail is being displayed on the terminal mobile 300. As a result, this variation can reliably improve user convenience.

Another feature of the present variation is that the first payment URL, the third URL, and the fourth payment URL are all included in the body of the reply e-mail rather than in the subject or address lines. This enables the user to display a reply e-mail on the mobile terminal 300 and to read the content of the body of the e-mail while at the same time easily accessing each of the web pages or the like represented by the URLs provided in the body of the e-mail through a single operation on the URL (S95, S103).

(2) Other Variations

The above examples describe cases of performing a "calculation" using the formula described above to determine the fee for printing, but the present invention is not limited to this method of determining the fee. That is, the fee table described above may include ranges for various parameters such as numbers of pages being printed, numbers of copies, paper size settings, and color option settings and may individually associate a fee amount with each of the ranges. In this case, the table may be referenced to determine a fee without any particular calculation.

Using the number of pages to be printed as an example, the table may record X yen for a range of pages from A pages to B pages, Y yen for a range of pages from B pages to C pages, etc. Thus, once the number of pages is acquired from the print data in the print file, the fee can be determined directly by referencing the table without performing the calculation described in the embodiment.

Further, while the present invention has been applied to a multifunction peripheral 200 that prints according to the inkjet method in the above description, the same effects can be obtained when applying the present invention to a multifunction peripheral 200 that prints according to the laser method. Further, the invention is not limited to the inkjet and laser printing methods but may be applied to printing devices that print using another well-known method such as the thermal transfer method.

The sequence charts shown in FIGS. 2, 7, 10, 13, and the like in the above description do not limit the present invention to the steps indicated therein. Steps may be added or deleted, or their order may be rearranged, without departing from the spirit and technical ideas of the invention.

The technique described in the embodiment and modifications described above may be suitably combined to be implemented.

What is claimed is:

1. An information processing apparatus comprising:
   a communication interface for communicating with a printing device via a network, the printing device being configured to perform image formation on a printing medium; and
   a controller configured to perform:
   (a) receiving a first e-mail from an external device, the first e-mail being an e-mail having a print file attached thereto and addressed to a device e-mail address assigned to the printing device;

(b) determining a fee to be charged for performing image formation on a printing medium on the basis of the print file attached to the first e-mail received in the receiving (a);

(c) generating a second e-mail including:
a first amount that is the amount of the fee determined in the determining (b); and
a first URL for a payment page for paying the first amount;

(d) transmitting the second e-mail generated in the generating (c) to the external device in reply to the first e-mail received in the receiving (a); and (e) transmitting, after payment of the first amount is completed through access to the first URL included in the second e-mail transmitted in the transmitting (d), either print data based on the print file or storage destination information for the print data to the printing device via the communication interface.

2. The information processing apparatus according to claim 1,
wherein, in the receiving (a), the first e-mail is received in a state that print setting values are set through access to a second URL for a print settings page, the print setting values being values for print settings for the image formation based on the print file attached to the first e-mail, and
wherein, in the determining (b), the controller determines the fee on the basis of the print file and the print setting values.

3. The information processing apparatus according to claim 2,
wherein the second e-mail generated in the generating (c) further includes a third URL for a settings modification page for modifying the print setting values.

4. The information processing apparatus according to claim 3,
wherein the third URL is indicated in the body of the second e-mail.

5. The information processing apparatus according to claim 2,
wherein the second e-mail generated in the generating (c) further includes at least one alternative example of the print setting values, the alternative example being created by modifying at least one of the print setting values.

6. The information processing apparatus according to claim 5,
wherein the second e-mail generated in the generating (c) further includes a second amount that is the amount of a fee to be charged for performing image formation on the basis of the alternative example of the print setting values.

7. The information processing apparatus according to claim 6,
wherein the second e-mail generated in the generating (c) further includes a fourth URL for a payment page for paying the second amount.

8. The information processing apparatus according to claim 7,
wherein the fourth URL is indicated in the body of the second e-mail.

9. The information processing apparatus according to claim 1,
wherein the controller is configured to further perform:
(f) assigning, in response to receiving an e-mail address request from the printing device, the device e-mail address to the printing device.

10. The information processing apparatus according to claim 1,
wherein the first URL is indicated in the body of the second e-mail.

11. A printing system comprising:
a printing device comprising:
a first controller; and
a printing engine configured to perform image formation on a printing medium; and
a data processing server comprising:
a second controller; and
a communication interface for communicating with the printing device via a network,
the second controller being configured to perform:
(a) receiving a first e-mail from an external device, the first e-mail being an e-mail having a print file attached thereto and addressed to a device e-mail address assigned to the printing device;
(b) determining a fee to be charged for performing image formation on a printing medium on the basis of the print file attached to the first e-mail received in the receiving (a);
(c) generating a second e-mail including:
a first amount that is the amount of the fee determined in the determining (b); and
a first URL for a payment page for paying the first amount;
(d) transmitting the second e-mail generated in the generating (c) to the external device in reply to the first e-mail received in the receiving (a); and
(e) transmitting, after payment of the first amount is completed through access to the first URL included in the second e-mail transmitted in the transmitting (d), either print data based on the print file or storage destination information for the print data to the printing device via the communication interface, and
the first controller being configured to perform:
(f) acquiring the print data transmitted in the transmitting (e) or acquiring the print data from a storage destination accessible using the storage destination information transmitted in the transmitting (e); and
(g) controlling the printing engine to perform image formation on a printing medium on the basis of the print data acquired in the acquiring (f).

12. The printing system according to claim 11,
wherein, in the receiving (a), the first e-mail is received in a state that print setting values are set through access to a second URL for a print settings page, the print setting values being values for print settings for the image formation based on the print file attached to the first e-mail, and
wherein, in the controlling (g), the image formation is performed on the basis of the print data acquired in the acquiring (f) and the print setting values.

13. The printing system according to claim 12,
wherein the second e-mail generated in the generating (c) further includes a third URL for a settings modification page for modifying the print setting values, and
wherein, in the controlling (g), the image formation is performed on the basis of the print data acquired in the acquiring (f) and modified print setting values, the modified print setting values being set by modifying at least one of the print setting values through access to the third URL.

14. An information processing method for an information processing apparatus comprising a controller and a communication interface for communicating with a printing device via a network, the printing device being configured to perform image formation on a printing medium, the information processing method comprising:
- (a) receiving a first e-mail from an external device, the first e-mail being an e-mail having a print file attached thereto and addressed to a device e-mail address assigned to the printing device;
- (b) determining a fee to be charged for performing image formation on a printing medium on the basis of the print file attached to the first e-mail received in the receiving (a);
- (c) generating a second e-mail including:
    a first amount that is the amount of the fee determined in the determining (b); and
    a first URL for a payment page for paying the first amount;
- (d) transmitting the second e-mail generated in the generating (c) to the external device in reply to the first e-mail received in the receiving (a); and
- (e) transmitting, after payment of the first amount is completed through access to the first URL included in the second e-mail transmitted in the transmitting (d), either print data based on the print file or storage destination information for the print data to the printing device via the communication interface.

* * * * *